(12) United States Patent
Neuner et al.

(10) Patent No.: US 9,938,363 B2
(45) Date of Patent: *Apr. 10, 2018

(54) METHOD FOR OBTAINING AND ISOLATING POLYCHLOROPRENE SOLIDS

(75) Inventors: Thomas-Oliver Neuner, Hilden (DE); Heiner Stange, Neuss (DE); Rolf Josten, Neuss (DE); Rolf Feller, Mettmann (DE); Mesut Fidan, Dormagen (DE)

(73) Assignee: ARLANXEO Deutschland GMBH, Dormagen (DE)

( * ) Notice: Subject to any disclaimer, the term of this patent is extended or adjusted under 35 U.S.C. 154(b) by 112 days.

This patent is subject to a terminal disclaimer.

(21) Appl. No.: 14/112,589

(22) PCT Filed: Apr. 19, 2012

(86) PCT No.: PCT/EP2012/057191
§ 371 (c)(1),
(2), (4) Date: Jan. 23, 2014

(87) PCT Pub. No.: WO2012/143459
PCT Pub. Date: Oct. 26, 2012

(65) Prior Publication Data
US 2014/0142268 A1 May 22, 2014

(30) Foreign Application Priority Data
Apr. 21, 2011 (EP) .................. 11163559

(51) Int. Cl.
*C08F 136/18* (2006.01)
*C08C 1/15* (2006.01)
*C08F 36/18* (2006.01)

(52) U.S. Cl.
CPC ........... *C08F 136/18* (2013.01); *C08C 1/15* (2013.01); *C08F 36/18* (2013.01)

(58) Field of Classification Search
CPC ... C08C 1/14; C08C 1/145; C08C 1/15; C08F 36/18; C08F 136/18
See application file for complete search history.

(56) References Cited

U.S. PATENT DOCUMENTS

| 2,187,146 A | | 1/1940 | Calcott et al. | |
|---|---|---|---|---|
| 3,050,509 A | * | 8/1962 | Heinz | C08C 1/14 528/485 |
| 3,437,509 A | * | 4/1969 | Coisne | C08C 1/14 427/342 |

(Continued)

FOREIGN PATENT DOCUMENTS

| EP | 0353802 A1 * | 2/1990 | ............. C08C 1/14 |
|---|---|---|---|
| GB | 1397658 | 6/1975 | |

(Continued)

OTHER PUBLICATIONS

Simpson, R.B., et al., "Rubber Pocket Book," iSmithers Rapra Publishing, 2002, p. 52.*

(Continued)

*Primary Examiner* — Nicholas E Hill

(57) ABSTRACT

The invention relates to methods for isolating and obtaining polychloroprene solids, wherein an aqueous polychloroprene dispersion is brought in contact with steam containing coagulant, whereby the polychloroprene solid coagulates.

25 Claims, 1 Drawing Sheet

(56) References Cited

U.S. PATENT DOCUMENTS

| | | | |
|---|---|---|---|
| 3,926,877 A | 12/1975 | Fogg et al. | |
| 4,103,074 A | 7/1978 | Hertel et al. | |
| 4,277,426 A | 7/1981 | Kato et al. | |
| 4,539,396 A * | 9/1985 | Yasui | C08C 1/14 |
| | | | 528/481 |
| 7,728,055 B2 * | 6/2010 | Ueda | C08F 6/22 |
| | | | 523/330 |
| 2014/0046015 A1 | 2/2014 | Neuner et al. | |

FOREIGN PATENT DOCUMENTS

| | | |
|---|---|---|
| JP | 60163933 | 8/1985 |
| JP | 2011012142 A | 1/2011 |

OTHER PUBLICATIONS

Tsotsas, E., et al., "Drying of Solid Materials," Ullmann's Encyclopedia of Industrial Chemistry, Sep. 15, 2010, vol. 11, 581-619.*
Ullmann's Encyclopedia of Industrial Chemistry, vol. A23, Rubber, Synthetic, 1993, VCH Verlag, Weinheim, Germany, pp. 252-262.
European Search Report from European Application No. 11163559, dated Aug. 30, 2011, two pages.

* cited by examiner

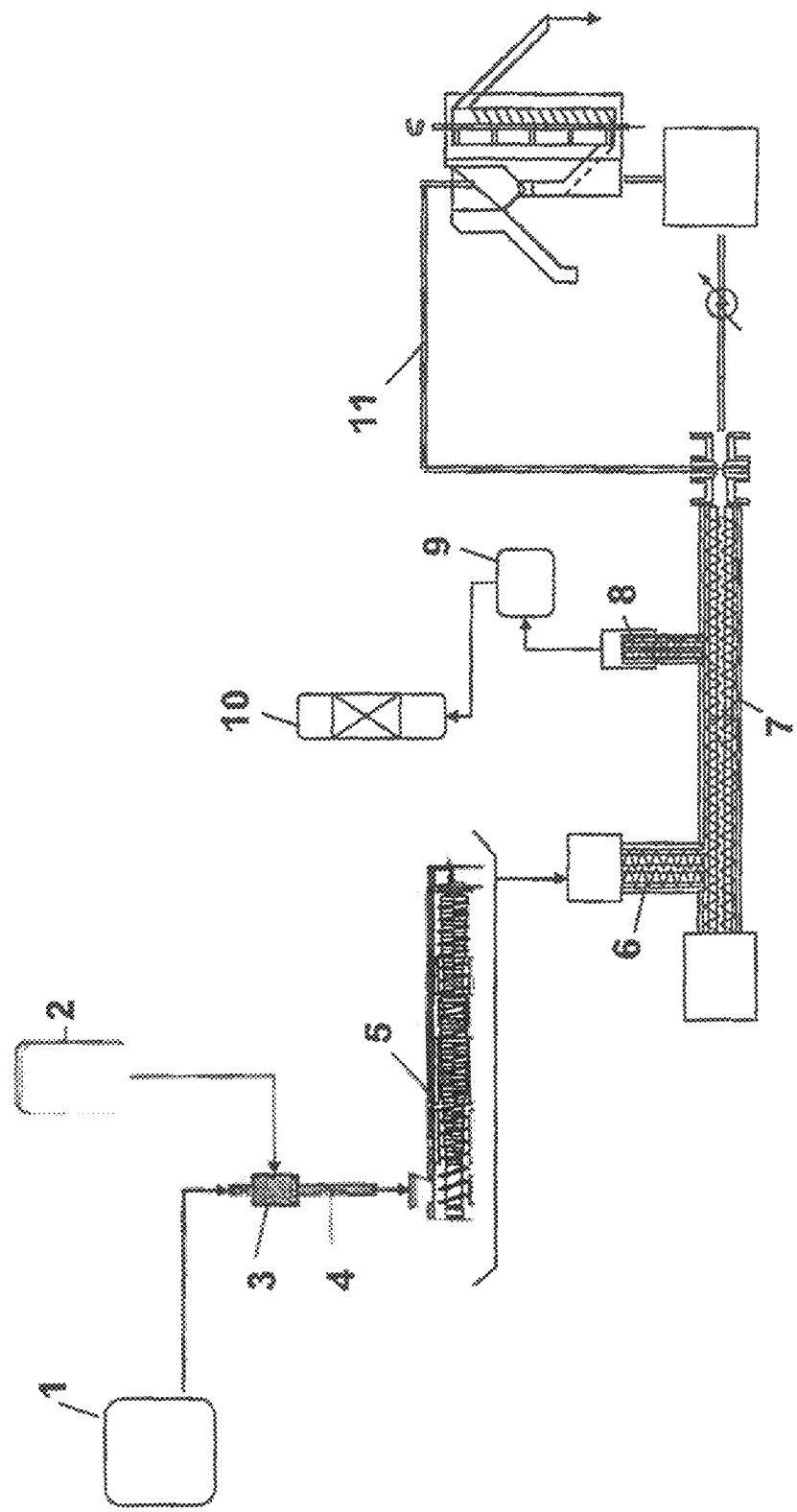

METHOD FOR OBTAINING AND
ISOLATING POLYCHLOROPRENE SOLIDS

The invention relates to a process for obtaining and isolating polychloroprene solids based on rubber dispersions, and to the resultant polychloroprene solids.

The production of polychloroprene has been known for a long time. Free-radical emulsion polymerization of chloroprene (2-chloro-1,3-butadiene) produces latices made of polychloroprene. For the purposes of this application, the expression "polychloroprene latices" and "polychloroprene dispersions" are also used for said latices.

In the production process, the monomers are polymerized in an emulsion system in an aqueous medium. This is generally of anionic type, and use is also rarely made of nonionic or cationic systems. The temperature range within which the polymerization is carried out comprises values of about 0° C. as far as above 80° C. The polymerization can therefore be initiated via free-radical generators that decompose thermally or via redox systems. Use is generally also made of molecular-weight regulators, such as mercaptans or xanthogen disulfides. In some cases, the molecular weight of the final product is also adjusted via copolymerization with sulfur and subsequent cleavage of the resultant sulfidic bonds. The desired conversion is established via termination of the reaction with a suitable reagent.

In the vast majority of cases, the resultant dispersion of polychloroprene in water is then demonomerized by passing steam through the material. Some of the resultant product here finds direct use in the form of latex in industry, but the greater part is freed from adherent water via coagulation and passed in the form of solid product to its final use.

Features of polychloroprene solids (known as "CR solids"), and also of vulcanizates produced therefrom, given appropriate mixture composition, are high resistance to weathering and to ozone, flame retardancy, very good aging properties, moderate oil resistance, and also considerable ability to resist many chemicals. They have good mechanical properties, advantageous resilience, and high wear resistance.

With respect to resilience, tensile strength, elongation at break, and modulus, vulcanizates made of polychloroprene latices (CR latices) exhibit values which are very similar to those of natural-latex vulcanizates, while vulcanizates made of polychloroprene latices at the same time exhibit good resistance to solvents, to chemicals, to oils and to fats.

As mentioned above, the separation of the CR solid from the dispersion is usually achieved via coagulation. Many different processes are known for this purpose. Mixing of the polychloroprene latices with a coagulating agent breaks the emulsion. Any conventional coagulating agent can be used for this purpose: by way of example, acidification, for example with a mineral acid or with an organic acid, can be used to coagulate the solid from CR latices produced under alkaline conditions. In many cases, simple acidification is not sufficient for complete coagulation of the polychloroprene, and it is also necessary to add strong electrolytes (salts comprising polyvalent cations, such as $Mg^{2+}$, $Ca^{2+}$, or $Al^{3+}$) in addition to the acid.

This method is disadvantageous because of the large amount of acid and, respectively, electrolytes needed in order to achieve complete precipitation of the solid. Relatively large amounts of precipitate remain within the product here, and this can impair important product properties. The coagulated solid is therefore washed with relatively large amounts of water in order to remove the precipitate, and this leads to economic and environmental problems. Furthermore, some of the polychloroprene is produced in the form of large clumps which in their interior still comprise unprecipitated CR latex or excess precipitate.

The prior art also discloses coagulation permitted via exposure to relatively high temperatures and/or to increased pressures, and also via additional exposure to electrolytes and to shear forces. A product of this type is exposed to considerable thermal stress, and this impairs product properties.

The usual method for separating polychloroprene from aqueous dispersions is freeze separation. Freeze separation is achieved here via cooling below the freezing point of the aqueous phase of the CR latex. Subsequent thawing under suitable conditions gives the polychloroprene in the form of coagulate which can be separated from the aqueous phase.

In order to arrive at coagulation rates that are sufficiently high for industrial purposes, freeze separation of the CR latex in carried out in thin layers. To this end, internally coolable coagulation rolls have been developed which dip into the CR latex during rotation and thus during rotation pick up a thin latex layer and carry out freeze separation on the surface (U.S. Pat. No. 2,187,146). The thin film made of CR coagulate and ice is scraped from the roll and passed onward.

There are other isolation processes known from the prior art. U.S. Pat. No. 4,103,074 describes a process for coagulating a polymer latex using a screw extruder, where the polymer latex is coagulated during conveying within the channel of the screw.

U.S. Pat. No. 3,926,877 describes a process for isolating a CR rubber where the CR latex is mixed with an aqueous carbon black dispersion before a coagulating agent is admixed with the latex. The coagulated product is separated from the aqueous phase.

DE 30 31 088 C2 discloses a process for producing a coagulated latex of a synthetic polymer where a gaseous or liquid coagulating agent is applied in the form of a mist by means of a spray nozzle to the polymer latex droplets so as to precipitate polymer beads.

The best-known and most widely used process for isolating CR solids is the freeze-coagulation process. Said process has environmental and economic disadvantages, since the coagulate frozen on the roll is very difficult to separate from the roll. The iced coagulate has to be thawed again and freed from the emulsifier by using water, and this in turn is undesirable from an environmental point of view. The subsequent mechanical dewatering of the coagulate is also very energy-intensive and time-consuming. The final drying of the coagulate is usually achieved by using drying ovens in which the residual water present within the product is removed.

It is now an object of the invention to provide a process for obtaining and isolating polychloroprene solids which does not have the abovementioned disadvantages.

A process of the type mentioned in the introduction is proposed in order to achieve said object, where an aqueous polychloroprene dispersion is brought into contact with steam comprising coagulating agent, and the polychloroprene solid consequently coagulates.

In the process of the invention, it is preferable that the CR solid coagulates in the form of a strand or in the form of crumb.

Surprisingly, it has been found that the process of the invention can be used with all polychloroprene dispersions, irrespective or the conventional polymerization process used to produce same.

The process of the invention is more energy-efficient, uses less resources, and is therefore more environmentally compatible.

The precipitated polychloroprene solid is then separated from the coagulation suspension and is then preferably dewatered in a dewatering apparatus. An example of equipment that can be used here is a screw-based strainer or dewatering rolls. Other known dewatering apparatuses can likewise be used.

The dewatered polychloroprene solid is then dried by means of a drying apparatus. The drying apparatus involves by way of example a twin-screw extruder, a screw-based dryer, or a kneader dryer. In the drying apparatus, additives and/or inert materials can preferably be added. By this means the other properties of the polychloroprene solid of the invention can be influenced in ideal manner for any requirement, and this can also be achieved after work-up. Preferred examples of additives for influencing product properties are stabilizers, accelerators, emulsifiers, liquors, antioxidants, and viscosity-influencing processing aids. Any conventional additives can be used. Examples of inert materials are nitrogen, argon, and carbon dioxide, where these can be added in order to influence polymer melting points.

The polychloroprene solid of the invention is preferably pelletized and cooled by means of the underwater pelletization process.

The polychloroprene dispersion preferably involves a latex which has been produced by means of emulsion polymerization. The polymerization takes place at a polymerization temperature of from 5° C. to 50° C. Conversion in the polymerization is usually in the range from 50% to 80%. After polymerization, excess monomer is removed by means of vacuum devolatilization to give a value in the range from 1000 ppm to 1 ppm. Emulsion polymerization processes are known from the prior art, and these can be used here.

It is optionally also possible to add one or more different comonomers, such as 2,3-dichlorobutadiene, alongside chloroprene (2-chloro-1,3-butadiene) for control of crystallization in the polymerization process.

The solids content of the polychloroprene dispersion from which the CR solid of the invention is obtained is preferably from 20 to 45% by weight, and the gel content of said dispersion is preferably in the range from 0 to 10% by weight. However, the gel content can also be increased in a controlled manner.

The steam comprising coagulating agent is preferably formed from steam and from an aqueous coagulating-agent solution. Coagulating-agent solution preferably used comprises an aqueous solution of a coagulating agent made of inorganic salts, preferably of metals of the second and third main group of the Periodic Table of the Elements.

Coagulating agent preferably used comprises calcium chloride, magnesium chloride, magnesium sulfate, aluminum chloride, and/or aluminum sulfate.

The coagulating-agent solution preferably has a coagulating-agent concentration of from 1% by weight to 60% by weight, preferably from 2% by weight to 55% by weight, particularly preferably from 10% by weight to 35% by weight, based on the coagulating-agent solution.

It is preferable that prior to contact with the steam comprising coagulating agent, the polychloroprene dispersion is diluted.

It is preferable here that the polychloroprene dispersion is diluted to a solids content of from 38% by weight to 45% by weight, preferably from 28% by weight to 35% by weight, and particularly preferably from 20% by weight to 28% by weight, based on the polychloroprene dispersion.

The dilution process preferably uses water, particularly demineralized water.

The dilution is important not only because the intention is to prevent or reduce caking and blocking of the flow/coagulation apparatus but also because it is possible to ensure ideal coagulation brought about via the contact between the CR dispersion and the steam comprising coagulating agent.

From 80 to 1000 kg of steam per metric ton of solid of the polychloroprene dispersion are particularly preferably used, preferably from 80 to 300 kg of steam per metric ton of solid of the polychloroprene dispersion.

From 10 to 40 kg of coagulating agent per metric ton of solid of the polychloroprene dispersion are moreover used, preferably from 10 to 25 kg of coagulating agent per metric ton of solid of the polychloroprene dispersion.

For the coagulation process, the aqueous polychloroprene dispersion passes through a flow/coagulation apparatus, where the flow/coagulation apparatus has apertures through which the steam comprising coagulating agent can pass and encounters the polychloroprene dispersion in the flow/coagulation apparatus. The polychloroprene solid of the invention coagulates here.

It is preferable that the polychloroprene solid is dewatered in the dewatering apparatus as far as a residual moisture level of from 10% by weight to 15% by weight, preferably from 1.0% by weight to 9% by weight, based on the polychloroprene solid.

It is preferable that the dewatered polychloroprene solid is dried in the drying apparatus as far as a residual moisture level of from 1% by weight to 1.5% by weight, particularly preferably from 0.5% by weight to 1% by weight, and very particularly preferably from 0.1% by weight to 0.5% by weight, based on the dewatered polychloroprene solid.

At the end of the drying phase in the drying apparatus, the polychloroprene solid takes the form of rubber melt. The melt is discharged through a die, and is processed through a cutting apparatus, and cooled and transported by water in the underwater pelletization process.

It is preferable that a release agent is added to the water in the underwater pelletization process. Examples of release agents that can be used here are talc powder and metal stearates. Other conventional release agents can likewise be used.

The resultant polychloroprene solid can be used for producing vulcanizates, rubber mixtures, and adhesives, or adhesive raw materials.

The invention is explained in more detail below with reference to a drawing:

PROCESS FOR ISOLATING AND OBTAINING A POLYCHLOROPRENE SOLID OF THE INVENTION

FIG. 1 shows a diagram of the structure of a process of the invention.

A polychloroprene dispersion is first produced by a conventional process.

Production of a Polychloroprene Dispersion

A polychloroprene dispersion is produced with use of the main formulation mentioned below (data being in parts by weight per 100 parts by weight of chloroprene used):

125 pts. by wt. of water
100 pts. by wt. of chloroprene
3 pts. by wt. of sodium salt of disproportionated abietic acid
0.5 pt. by wt. of potassium hydroxide 0.2 pt. by wt. of n-dodecyl mercaptan 0.5 pt. by wt. of sodium salt of formaldehyde-condensed naphthalenesulfonic acid The polychloroprene dispersion is produced via free-radical emulsion polymerization at from 40° C. to 45° C. from the abovementioned components by conventional methods (e.g. Ullmanns Encyclopedia of Industrial Chemistry, vol. 23A, pp. 252-262.). The polymerization is terminated at a conversion of from 50% to 70%, and the dispersion is freed from residual monomers via vacuum devolatilization.

Said dispersion is worked up with the aid of the process of the invention, which can be described as follows:

The abovementioned polychloroprene dispersion is conveyed from a storage container 1 into a flow/coagulation apparatus 3. The polychloroprene dispersion can be diluted with water prior to input into the flow/coagulation apparatus 3.

The aqueous coagulating agent, which has been mixed in advance with steam, is introduced from another storage container 2 into the flow/coagulation apparatus 3, and by way of apertures therein is brought into contact with the polychloroprene dispersion. The polychloroprene dispersion here is quantitatively precipitated in the flow/coagulation apparatus 3 and in the precipitation tube 4 that follows.

The precipitation tube 4 leads to the intake region of the dewatering apparatus 5, where the precipitated polychloroprene solid of the invention is dewatered.

The dewatered polychloroprene solid either in the form of a strand or in the form of crumb is introduced into the drying apparatus 7 and is dried. Additives or inert materials can be metered into the material within the feed screw 6 or the subsequent region of the drying apparatus 7, in order to influence the properties of the polychloroprene solid of the invention.

The vapors are drawn off by way of evacuated upward protuberances 8, within which there are stuffing screws to ensure that rubber particles are retained. Beyond the upward protuberances 8 there are separators 9 in which entrained rubber particles are separated and then introduced into an extracted air scrubber 10.

The hot rubber melt from the drying apparatus 7 is chipped in the underwater pelletization process by way of a die and chopping blades. The cooling and the transport of the chips is achieved by way of a stream 11 of water which optionally can have admixed additives (e.g. release agent).

The chips are first separated from the water by way of a sieve chute. The residual energy in the chips vaporizes the water adhering on the surface. This can be supplemented by a stream of warn air to promote removal of the adherent water.

The chips are then further cooled, and talc powder is optionally applied thereto. They are then weighed into sacks and packaged on pallets or in crates.

What is claimed is:

1. A process for obtaining polychloroprene solids, the process comprising:
   pre-mixing steam with a coagulating agent;
   passing a stream of an aqueous polychloroprene dispersion through a flow coagulation vessel comprising a plurality of steam inlet apertures, and
      injecting the steam comprising the coagulating agent into the stream of the aqueous polychloroprene dispersion via the apertures of the flow coagulation vessel to coagulate the polychloroprene and form polychloroprene solids in a coagulation suspension,
   wherein the aqueous polychloroprene dispersion is contacted with an amount of steam at a ratio of 80 kg to 1000 kg of steam per metric ton of solid polychloroprene in the polychloroprene dispersion to provide 10 to 40 kg of coagulating agent per metric ton of solid polychloroprene in the polychloroprene dispersion.

2. The process as claimed in claim 1, wherein contacting of the aqueous polychloroprene dispersion with steam is done at a ratio of 80 kg to 300 kg of steam per metric ton of solid of the polychloroprene dispersion.

3. The process as claimed in claim 1, further comprising separating the polychloroprene solids from the coagulation suspension.

4. The process as claimed in claim 3, wherein:
   the coagulating agent comprises inorganic salts of metals of the second and third main group of the periodic table of the elements;
   the process further comprises;
      prior to contacting the aqueous polychloroprene solution with the steam, diluting the aqueous polychloroprene solution to a solids content of 20% by weight to 35% by weight, based on the polychloroprene dispersion;
      dewatering the polychloroprene solid to a residual moisture level of 1% by weight to 15% by weight, based on the polychloroprene solid, to produce dewatered polychloroprene solids; and
      drying the dewatered polychloroprene solid to a residual moisture level of 0.1% by weight to 1.5% by weight based on the dewatered polychloroprene solid.

5. The process as claimed in claim 3, wherein:
   the coagulating agent comprises calcium chloride, magnesium chloride, magnesium sulfate, aluminum chloride, and/or aluminum sulfate,
   the process further comprises, prior to contact of the aqueous polychloroprene solution with the steam, diluting the aqueous polychloroprene solution to a solids content of 20% by weight to 28% by weight, based on the polychloroprene dispersion;
   the contacting of the aqueous polychloroprene dispersion with the steam is done at a ratio of 80 kg to 250 kg of steam per metric ton of solid of the polychloroprene dispersion wherein the steam has a concentration of coagulating agent sufficient to provide 10 to 25 kg of coagulating agent per metric ton of solid of the polychloroprene dispersion; and
   the process further comprises dewatering the polychloroprene solid to a residual moisture level of 1% by weight to 9% by weight, based on the polychloroprene solid, to produce dewatered polychloroprene solids, and drying the dewatered polychloroprene solid to a residual moisture level of 0.1% by weight to 0.5% by weight based on the dewatered polychloroprene solid.

6. The process as claimed in claim 3, further comprising dewatering the polychloroprene solids by means of a dewatering apparatus.

7. The process as claimed in claim 6, wherein dewatering the polychloroprene solid comprises dewatering to a residual moisture level of 1% by weight to 15% by weight based on the polychloroprene solid.

8. The process as claimed in claim 6, further comprising drying the dewatered polychloroprene solids by means of a drying apparatus.

9. The process as claimed in claim 8, further comprising adding additives and/or inert materials to the dewatered polychloroprene solids in the drying apparatus.

10. The process as claimed in claim 9, wherein the additives comprise stabilizers, accelerators, emulsifiers, liquors, antioxidants, and/or viscosity-influencing processing aids for influencing properties of the polychloroprene, and the inert materials comprise nitrogen, argon, and carbon dioxide for influencing polymer melting points.

11. The process as claimed in claim 8, wherein drying of the dewatered polychloroprene solid comprises drying to a residual moisture level of 0.1% by weight to 1.5% by weight based on the dewatered polychloroprene solid.

12. The process as claimed in claim 11, wherein the dried polychloroprene solid comprises a rubber melt after drying in the drying apparatus.

13. The process as claimed in claim 8, further comprising pelletizing and cooling the dried, dewatered polychloroprene solid by means of an underwater pelletization process.

14. The process as claimed in claim 13, wherein the aqueous polychloroprene dispersion is a latex.

15. The process as claimed in claim 14, further comprising producing the aqueous polychloroprene dispersion by means of emulsion polymerization.

16. The process as claimed in claim 15, wherein the pre-mixing comprises mixing the steam and an aqueous coagulating agent solution.

17. The process as claimed in claim 16, wherein contacting of the aqueous polychloroprene dispersion with the steam comprising the coagulating agent is done at a ratio sufficient to provide 10 to 25 kg of the coagulating agent per metric ton of solid of the polychloroprene dispersion.

18. The process as claimed in claim 16, wherein the aqueous coagulating-agent solution comprises a coagulating agent comprising inorganic salts.

19. The process as claimed in claim 18, wherein the inorganic salts comprise inorganic salts of metals of the second and third main group of the periodic table of the elements.

20. The process as claimed in claim 18, wherein the coagulating agent comprises calcium chloride, magnesium chloride, magnesium sulfate, aluminum chloride, and/or aluminum sulfate.

21. The process as claimed in claim 20, wherein the coagulating-agent solution has a coagulating-agent concentration of 1% by weight to 60% by weight based on the coagulating-agent solution.

22. The process as claimed in claim 21, further comprising diluting the aqueous polychloroprene solution prior to contact of the aqueous polychloroprene solution with the steam comprising a coagulating agent.

23. The process as claimed in claim 22, wherein the diluting comprises diluting the polychloroprene dispersion to a solids content of 20% by weight to 45% by weight based on the polychloroprene dispersion.

24. The process as claimed in claim 23, wherein the diluting comprises diluting the polychloroprene dispersion to a solids content of 20% by weight to 35% by weight based on the polychloroprene dispersion.

25. A process for obtaining pelletized polychloroprene solids, the process comprising:
   contacting an aqueous polychloroprene dispersion with steam comprising a coagulating agent to coagulate the polychloroprene into polychloroprene solids in a coagulation suspension;
   separating the polychloroprene solids from the coagulation suspension;
   dewatering the polychloroprene solids by means of a dewatering apparatus;
   drying the dewatered polychloroprene solids by means of a drying apparatus;
   pelletizing and cooling the dried, dewatered polychloroprene solids by means of an underwater pelletization process; and
   adding release agents to the water in the underwater pelletization process.

* * * * *